Jan. 29, 1963 W. E. BRADLEY ETAL 3,075,902

JET-ELECTROLYTIC ETCHING AND MEASURING METHOD

Filed March 30, 1956 3 Sheets-Sheet 1

INVENTORS
WILLIAM E. BRADLEY
JOHN ROSCHEN
BY
Allen V. Hazeltine
ATTORNEY

JET-ELECTROLYTIC ETCHING AND MEASURING METHOD

Filed March 30, 1956 3 Sheets-Sheet 2

INVENTORS
WILLIAM E. BRADLEY
JOHN ROSCHEN

BY

ATTORNEY

Jan. 29, 1963 W. E. BRADLEY ETAL 3,075,902

JET-ELECTROLYTIC ETCHING AND MEASURING METHOD

Filed March 30, 1956 3 Sheets-Sheet 3

INVENTORS
WILLIAM E. BRADLEY
JOHN ROSCHEN
BY
ATTORNEY

United States Patent Office 3,075,902 Patented Jan. 29, 1963

1

3,075,902

JET-ELECTROLYTIC ETCHING AND MEASURING METHOD

William E Bradley, New Hope, and John Roschen, Hatboro, Pa., assignors, by mesne assignments, to Philco Corporation, Philadelphia, Pa., a corporation of Delaware Filed Mar. 30, 1956, Ser. No. 575,159
1 Claim. (Cl. 204—143)

This invention relates to an electrochemical method and to apparatus for practicing this method, and more particularly to a method and apparatus for measuring the thickness of a semiconductive material during electrochemical treatment thereof. Still more particularly, the invention relates to an electrochemical method, and apparatus therefor, for producing a region of predetermined thickness in a semiconductive body.

In recent years, semiconductive devices have assumed an increasingly important role in electronic apparatus, in large measure by reason of their extremely long life, reliability, and lower power consumption. However, because of the relatively high cost of fabricating them reproducibily, such devices have been utilized less widely than would otherwise be the case. This high cost is attributable primarily to the cost of processing the semiconductive materials contained therein, and a substantial portion of this processing cost arises as a result of the methods now generally used in the dimensioning of these materials.

Specifically, an especially troublesome, and hence expensive, step in the dimensioning process has heretofore been that of reducing the thickness of a region of the semiconductive body to a predetermined very small value, frequently of the order of tenths of thousandths of an inch, while maintaining substantially undisturbed the crystalline structure within this reduced-thickness region, and without contaminating chemically the latter surfaces. The various methods which have heretofore been proposed to accomplish this difficult step have typically suffered from one or more of the following defects. In certain of the known methods, inordinately slow rates of reduction in the thickness of the semiconductive body have been necessary to avoid removing too much of the semiconductive material and, where high accuracy is essential, numerous time-consuming stoppages of the thickness-reducing operation have been required to permit measurements of the thickness of the body. In many cases, the process has produced substantially different and unpredictable effects on successively treated semiconductive bodies constituted of the same material, thereby causing expensive and time-wasting spoilages of semiconductive materials which are themselves expensive. In other methods, the accuracy with which a region of given thickness is produced has been found to be dependent on the accuracy with which the initial thickness of the semiconductive body, and the parallelism of the opposing surfaces thereof, have been established. Consequently, before utilizing the latter methods, it is necessary to employ expensive precision-lapping techniques to provide a semiconductive body having the requisite initial thickness and parallelism of surfaces. Still other methods have employed coarse abrasives which pit and score the surfaces of the semiconductive body, distorting the crystal structure thereof and consequently necessitating additional expensive and time-consuming treatment of the surfaces by chemical etchants to restore the lattice symmetry to at least a minimally satisfactory state. If automatic, many of these processes are limited stringently with regard to the range of thicknesses for which such automatic control is feasible.

It is accordingly an object of the invention to provide an improved method for measuring the thickness of semiconductive material during electrochemical treatment thereof.

2

Another object of the invention is to provide an improved method for measuring the thickness of a semiconductive body during electrochemical treatment thereof.

An additional object of the invention is to provide an improved method for producing a region of predetermined thickness in a semiconductive body.

Yet another object of the invention is to provide novel apparatus for carrying out our improved method.

A further object of the invention is to provide an improved method for producing a region of predetermined thickness in a semiconductive body, wherein the thickness of the aforesaid region may be continually measured during processing.

Still another object of the invention is to provide an improved method for producing a region of predetermined thickness in a semiconductive body, wherein the final thickness of the region processed according to our method is substantially independent of the initial thickness of the body and any deviations from parallelism of its opposing surfaces.

A further object of the invention is to provide an improved method for producing a region of predetermined thickness in a semiconductive body, in the practice of which method the body is inherently protected against deleterious contamination, and the crystalline structure of the surfaces of the processed region is maintained substantially intact.

An additional object of the invention is to provide an improved method for producing a region of predetermined thickness in a semiconductive body, which method is inexpensive and may be performed reliably by relatively unskilled personnel.

Another object of the invention is to provide an improved method for producing a region of predetermined thickness in a semiconductive body, which method may readily be performed with a high degree of precision and requires no demounting of the semiconductive body to perform a thickness measurement.

An additional object of the invention is to provide an improved method and apparatus for producing a region of predetermined thickness in semiconductive material, in which substantially the same apparatus may be utilized both for reducing, and for measuring the thickness of the material within this region.

Still another object of the invention is to provide novel apparatus which automatically effects reduction of the thickness of a region of a semiconductive body to substantially a predetermined value, and then automatically terminates the thickness-reducing operation.

An even further object of the invention is to provide an improved automatic apparatus for producing, in a semiconductive body, a region of a predetermined thickness whose value may lie within a range of thicknesses having a width substantially greater than those of the ranges provided by prior-art automatic apparatus directed to this purpose.

A specific object of the invention is to provide an improved method and apparatus for producing a region of predetermined thickness in a semiconductive body, which method may be performed rapidly and which apparatus is inexpensive and easily adapted to mass-production techniques.

In accordance with the invention, the foregoing objects are achieved by the provision of a method for deriving an indication of the thickness of semiconductive material remaining between a first rectifying barrier in a semiconductive body and an opposing surface thereof, as this surface is etched to reduce the aforementioned thickness. In our method, the thickness of the semiconductive material is reduced by applying, to said surface, electrically conductive etching means which are operative to effect etching thereof progressively in the direction of the first rectifying barrier, and which are used to provide a second rectifying barrier therein. To ascertain the thickness of the semiconductive material, a space-charge region of controllable thickness is produced within the semiconductive material by biasing one of the aforementioned barriers in the reverse direction, and a signal is derived in response to reduction of said material thickness to a value equal to the aforesaid space-charge region thickness. In this regard, when the material thickness becomes equal to the space-charge region thickness, the electrical impedance between the first rectifying barrier and the etching means decreases substantially, and as a result, the intensity of the current flowing across the reverse-biased barrier increases substantially. Accordingly, the aforementioned derived signal may comprise this increase in current intensity, or it may be a quantity physically related thereto.

In a more specific aspect of the method of the invention, each of the rectifying barriers in the semiconductive body is provided by directing, against the appropriate surface of the semiconductive body, a stream of an electrolytic solution which forms a rectifying contact therewith. The aforementioned reverse-biasing potential is applied between one of these streams and the semiconductive body, while the potential of the other stream of electrolytic solution may be established at a value equal to or close to the potential of the semiconductive body. Preferably, the potential applied to this other stream is applied in reverse-biasing polarity, thereby to prevent undesired localized pitting of the surface impinged by the first-named stream which occasionally occurs when said other stream is forward-biased. Alternatively, this other stream may be electrically isolated from external sources of potential.

To determine the thickness of the region of the semiconductive body bounded by the areas of impingement of the two streams, the value of the potential applied to said one stream may be varied thereby to vary the depth of the space charge region produced within the body by this potential. When this potential attains the critical value corresponding to an extension of the space-charge region from one surface of the semiconductive body to the other, i.e. when punch-through occurs, the electrical impedance between the two streams of electrolyte decreases by a substantial amount. As an important feature of the invention, the potential at which this decrease in impedance takes place is detected and serves as an accurate indication of the thickness of the semiconductive body.

Alternatively, the value of the potential applied to said one stream may be established at the aforementioned critical value, and the thickness of the semiconductive body may be reduced until a substantial decrease in impedance between the two streams of electrolyte indicates that the thickness of the semiconductive body is now of the desired value.

In still another aspect of the method of our invention, only one of the rectifying contacts to the semiconductive body is produced by means of a stream of electrolytic solution directed against a surface of the semiconductive body, while the other rectifying contact is provided by means of a metallic electrode applied to the surface of the body opposing the surface impinged by the stream. In this arrangement, the stream of electrolytic solution is established at a potential which is equal to the potential of the semiconductive body or is close to this potential and has a polarity such as to reverse-bias the rectifying contact provided by the electrolytic solution. The potential of the metallic contact is also established in a back-biasing direction with respect to the potential of the body. This thickness measurement may be made by varying the potential applied to the metallic contact, thereby to determine the value thereof for which punch-through occurs. Alternatively, the potential of the metallic contact may be established at a value which corresponds to the desired thickness of the semiconductive body, and the thickness of the body may then be reduced until the inception of punch-through indicates that the desired thickness has been achieved.

In the foregoing embodiment of our method, it is by no means necessary to the performance of the thickness measurement that the measuring potential be supplied to the metallic contact. Inasmuch as the electrolytic stream also provides a rectifying contact to the semiconductive body, the measuring voltage may be applied to it, and the potential of the metallic contact may be established at or near body potential and preferably in a back-biasing sense. As in the preceding cases, the measuring potential either may be varied to determine the punch-through voltage, or it may be established at a fixed value which corresponds to the desired thickness.

In each of the foregoing embodiments of our novel method in which the thickness is reduced by electrolytic etching, an etching potential is applied to the electrolytic solution and, in the case of n-type semiconductive bodies, light is applied to the surfaces of the semiconductive body which are to be etched. However, in the case of p-type bodies, the aforedescribed thickness measurement is preferably done in the absence of light which is sufficiently intense to degrade the rectifying contact between the electrolytic solution and the body by promoting the generation of a substantial number of holes.

The foregoing are only a few of the ways in which, in accordance with our invention, the thickness of a semiconductive body may be measured in the course of the etching thereof. Thus, while in the above-described embodiments of our method, the potentials applied to the etching means and to the rectifying-contact means have each been applied by connections between the respective means and the body, this particular mode of application is not essential to the successful practice of our method; instead the potentials may be applied by connecting a single source of voltage between the two means, while making no connection whatever to the semiconductive body. The voltage supplied by this source may then be varied until it attains that critical value for which punch-through just occurs, and which therefore indicates the thickness of the body. Alternately, a voltage corresponding to the desired thickness may be applied between the etching means and the rectifying-contact means, and etching of the body may be continued until a substantial drop in impedance occurs between the two means.

In a preferred specific embodiment of the method of our invention, the semiconductive body is constituted of n-type germanium and is arranged between coaxial and opposed streams of electrolytic solution. During a first group of time-spaced intervals, the surfaces of the semiconductive body to which the electrolytic solution is applied are illuminated to promote generation of holes on these surfaces, and pulses of negative direct voltage are applied non-contemporaneously to the respective streams of electrolyte, thereby to produce anodic etching by each stream of the semiconducitve body, and consequent reduction of its thickness from both sides, in the region between the two streams. During a second group of time-spaced intervals which alternate with the intervals of the first group, the illumination is removed from the body, thereby to permit formation of a rectifying contact between each of the streams and the body, and the voltage value at which punch-through occurs is determined. When this value is substantially equal to the value of voltage corresponding to the desired thickness, the etching process is discontinued.

Our invention additionally contemplates novel apparatus for practicing our method. This apparatus comprises means for applying, to a surface of a semiconductive body opposite a rectifying barrier, electrically-conductive etching means which produce a second rectifying barrier within the body, and means for applying, to one of the means which provide these rectifying barriers, a potential which is poled to bias the barrier provided by the latter means in the sense of difficult conduction, thereby to produce within the body a space-charge region of controllable thickness. Importantly, the apparatus also comprises means for deriving a signal in response to reduction of the thickness of the semiconductive material bounded by the two barriers to a value equal to said space-charge region thickness, and preferably includes means for automatically removing the aforesaid potential in response to this signal.

Other advantages and features of the invention will become apparent from a consideration of the following detailed description, taken in connection with the accompanying drawings, in which.

Considering our invention in greater detail, there will now be described an embodiment of our method which is particularly well adapted for producing a region of predetermined thickness in a body of n-type germanium by means of electrolytic etching, and for automatically terminating the etching process when this thickness has been obtained. In this arrangement, a pair of opposed electrolytic jets are employed, and, during certain time-spaced intervals, a negative voltage of varying amplitude is applied alternately to the two jets while the semiconductive body is irradiated with light, thereby to produce electrolytic etching of both surfaces impinged by the jets. During other time-spaced intervals which alternate with the aforementioned intervals, the intensity of the light applied to the body is reduced, thereby to permit each jet to form with the body a rectifying contact which is reverse-biased when the negative, varying voltage is applied thereto, thereby producing a space-charge region extending into the body; the other jet serves as a source of current carriers when punch-through occurs. Because of the sudden drop in impedance between the jets which occurs at punch-through, and because the varying voltage is applied to the jets by way of substantial impedances, upon punch-through, the latter voltage tends to limit sharply at a peak value indicative of the thickness of the body. Means are provided for sensing this peak value and for terminating the process when this value decreases to the critical value corresponding to the desired thickness of the semiconductive body.

Figure 1:
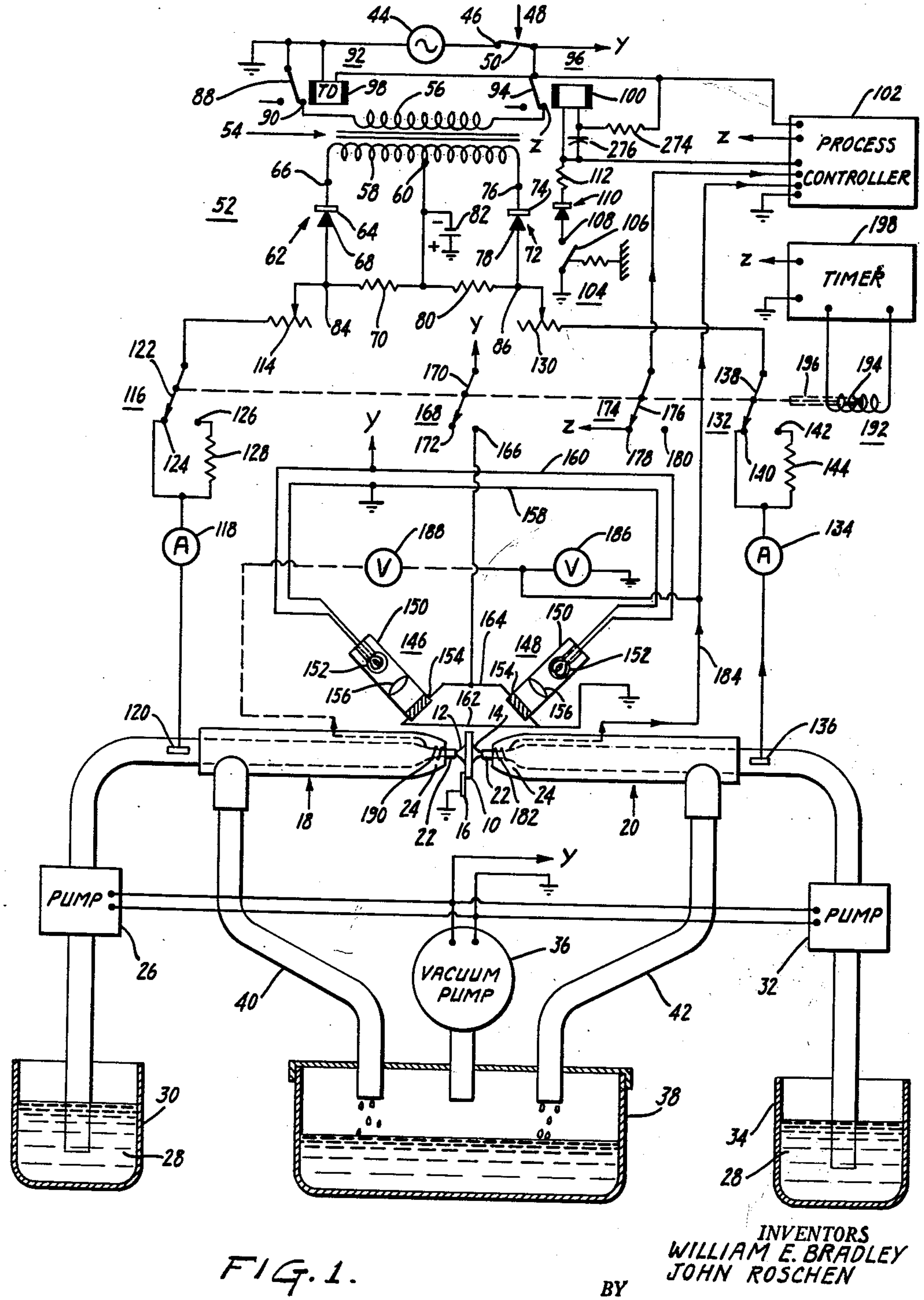
FIGURE 1 illustrates diagrammatically an electrochemical apparatus suitable for use in practicing the invention.

In practicing the method in this embodiment, the arrangement depicted in FIGURE 1 has been found to be particularly useful. In this arrangement, the semiconductive body 10 to be dimensioned, which in the present instance is a wafer of monocrystalline n-type germanium, is positioned so as to be impinged on opposing surfaces by a pair of coaxial and opposing jets of electrolytic solution 12 and 14 respectively, and in addition is connected to a point at reference potential by way of a conductive tab 16 ohmically soldered thereto. The jets 12 and 14 are in turn produced by jet-forming nozzles 18 and 20 respectively, each of which includes coaxially-arranged inner and outer nozzles 22 and 24 respectively. A first pump 26 draws an electrolytic solution 28 from a first reservoir 30 and supplies it to inner nozzle 22 of jet-forming nozzle 18, while a second pump 32 draws solution 28 from a second reservoir 34 and supplies it to inner nozzle 22 of jet-forming nozzle 20. Separate reservoirs are used to contain the solutions supplied to the two nozzles in order to isolate electrically these solutions from one another.

In addition, suction is applied to outer nozzles 24 of jet-forming nozzles 18 and 20 by means of a vacuum pump 36, which is arranged to evacuate a gas-tight vessel 38 with which these nozzles communicate by way of tubes 40 and 42 respectively. By appropriate adjustment of the pressure with which electrolytic solution 28 is supplied to the inner nozzle 22, and the amount of suction which is applied to the outer nozzle 24 of each jet-forming nozzle, it is feasible to produce a jet of electrolytic solution which impinges only a small predetermined area of the surface of body 10, importantly leaving the remainder of the surface practically dry. Such jet-forming nozzles and their operation are described and claimed in the co-pending patent application Serial No. 550,722 of L. W. Hershinger, filed December 2, 1955 (now abandoned), and entitled "Method of and Apparatus for Etching," and assigned to the assignee of the present application. Accordingly, no further discussion of the structure and operation of these nozzles is deemed necessary herein.

Pumps 26, 32 and 36 are energized from a source 44 of alternating voltage, which has one terminal connected to a point at ground potential and its other terminal connected to the fixed contact 46 of a line-switch 48, whose blade 50 is connected to a terminal Y. Each of the pumps is connected to source 44 via terminal Y.

To supply to jets 12 and 14 the electrical potentials required to etch and to measure the thickness of body 10, a power supply 52 is provided which comprises a transformer 54 having a primary winding 56 and a secondary winding 58 which has a center-tap 60. It additionally comprises a first unidirectional conductor 62 whose cathode 64 is directly connected to terminal 66 of secondary winding 58 and whose anode 68 is connected to center-tap 60 via a bleeder resistor 70, and a second unidirectional conductor 72 whose cathode 74 is directly connected to terminal 76 of secondary winding 58 and whose anode 78 is connected to center tap 60 via a bleeder resistor 80. In addition, a source of negative potential 82 connects center-tap 60 to a point at ground potential. The interconnection 84 of resistor 70 and unidirectional conductor 62 serves as one output terminal of the power supply, while the interconnection 86 of resistor 80 and unidirectional conductor 72 serves as the other output terminal thereof. At each of these output terminals, there are produced periodically recurring, sinusoidal half-wave pulses which are non-contemporaneous with the pulses produced at the other output terminal. One of the sets of pulses so derived is supplied to one of the electrolytic jets, and the alternate set is supplied to the other jet, as described hereinafter in detail.

Power supply 52 is itself energized by source 44, the grounded terminal of which is connected to one terminal of primary winding 56 by way of the armature 88 and fixed contact 90 of a time-delay relay 92, and the other terminal of which is connected to the other terminal of primary winding 56 by way of terminal Y and the armature 94 and fixed contact Z of a relay 96. Coil 98 of time-delay relay 92 is connected to a point at ground potential and to terminal Y of line switch 48 and may be energized from source 44 by closing this switch.

The energization of coil 100 of relay 96 is controlled by means of a process controller 102, whose specific function and structure are described in greater detail hereinafter, and to which coil 100 is connected. To actuate relay 96 initially, there is provided a normally-open momentary contact switch 104 whose blade 106 is connected to a point at ground potential and whose fixed contact 108 is connected, via a unidirectional conductor 110 and a current-limiting resistor 112, to one terminal of coil 100. The other terminal of this coil is supplied with current from terminal Y. By closing switch 104 at a time when line-switch 48 and armature 88 are closed, coil 100 is energized directly from source 44, and is maintained energized thereafter by process controller 102 until such time as the latter, in response to an appropriate signal, de-energizes coil 100. When coil 100 is de-energized, armature 94 opens from contact Z, thereby de-energizing power-supply 52 and terminating the process according to our invention.

As aforementioned, each of jets 12 and 14 is energized from power supply 52. More particularly, jet 12 is energized by a voltage derived from output terminal 84, and supplied via a current-adjusting rheostat 114, a single-pole double-throw switch 116, and an ammeter 118, to an electrode 120 immersed in the electrolytic solution supplied to this jet. Specifically, the blade 122 of switch 116 is directly connected to rheostat 114; fixed contact 124 of the switch is connected via a low-impedance conductor to ammeter 118, while fixed contact 126 of this switch is connected via a relatively high-valued resistor 128 to ammeter 118. Thus, when it is desired to supply a relatively high current to electrode 120, thereby to produce anodic etching of body 10 at a substantial rate, switch blade 122 is closed to contact 124, thereby supplying the etching current via only a single current-limiting resistor, namely rheostat 114. Where, by contrast, it is desired to supply a much smaller current to electrode 120 to carry out a thickness measurement according to the invention, switch-blade 122 is closed to contact 126, thereby inserting high-valued resistor 128 in series with rheostat 114.

Similarly, electrolytic jet 14 is energized by a voltage derived from output terminal 86 and supplied via a current-adjusting rheostat 130, a single-pole, double-throw switch 132 and an ammeter 134, to an electrode 136 immersed in the electrolytic solution supplied to this jet. The blade 138 of switch 132 is connected to rheostat 130; fixed contact 140 of the latter switch is connected via a low-impedance conductor to ammeter 134, while fixed contact 142 of this switch is connected to this ammeter via a high-valued resistor 144. As in the preceding case, to effect anodic etching of body 10 at a substantial rate, switch blade 138 is closed to contact 140, thereby supplying current to electrode 136 via the relatively low resistance of rheostat 130, while to effect a thickness measurement of body 10 under low-current conditions, switch blade 138 is closed to contact 142, thereby inserting high-valued resistor 144 in series with rheostat 130.

In order to produce rapid and smooth etching of an n-type semiconductive body, it is desirable to generate a copious supply of holes on the surfaces to be etched. In the preferred embodiment, this hole generation is promoted by irradiating these surfaces of body 10 with electromagnetic waves having wavelengths within the visible and infra-red spectrum. To this end, an illumination system is provided, comprising light sources 146 and 148 each of which may comprise a housing 150 having an electric lamp 152 mounted at one end thereof and a solenoid-actuatable shutter 154 mounted at the other end thereof. Shutter 154 is preferably of a form which transmit light and infra-red radiations when its solenoid is de-energized, and blocks transmission of light and infra-red radiations when its solenoid is energized. Also contained within housing 150 is a condensing lens 156 which focuses the light supplied by lamp 152 upon an area of body 10 which is to be etched.

The filaments of lamps 152 are connected in parallel relationship by conductors 158 and 160 respectively, and are energized by source 44, conductor 158 being connected to a point at ground potential and conductor 160 being connected to terminal Y.

The solenoids of shutters 154 are also connected in parallel relationship, by conductors 162 and 164 respectively, and are energized from source 44. In this regard, conductor 162 is connected to a point at ground potential, while conductor 164 is connected to one fixed contact 166 of a single-pole, double-throw switch 168 whose blade 170 is connected to terminal Y. When etching is desired, blade 170 is closed to the other fixed terminal 172 of switch 168, which terminal is electrically isolated from source 44. This action de-energizes the solenoids of shutters 154, thereby conditioning these shutters to transmit light to body 10 from lamps 152.

When a thickness measurement is to be made, it is important, for reasons to be considered hereinafter, that no intense illumination irradiate body 10. Therefore, to remove the illumination from body 10 during this measurement, the solenoids of shutters 154 are energized from source 44 by closing blade 170 to contact 166.

In the specific arrangement shown in FIGURE 1, and for reasons which are also discussed hereinafter, in order to maintain relay coil 100 energized during the etching intervals of our process, it is necessary to supply a holding signal to process controller 102. This holding signal is derived from source 44 and is supplied to controller 102 via a single-pole, double-throw switch 174 whose blade 176 is connected to the appropriate input terminal of process controller 102 and one of whose contacts 178 is connected to terminal Z. Switch blade 176 is closed to contact 178 during the etching intervals and is closed, during the thickness-measuring intervals, to the other fixed contact 180 which is electrically isolated from source 44.

During each measuring interval and in accordance with our invention, a voltage indicative of the thickness of body 10 between the respective areas of impingement of jets 12 and 14, is derived by a probe 182, which may comprise several turns of a small-diameter platinum wire wound tightly over the surface of the inner nozzle 22 of jet-forming nozzle 20. The voltage derived by probe 182 is supplied via a conductor 184 to an input terminal of process controller 102. As an important operational feature of the apparatus forming part of our invention, process controller 102 is constructed and arranged to de-energize coil 100 of relay 96 when the peak value of the voltage sensed by probe 182 falls just below a predetermined value corresponding to the desired thickness of body 10. De-energization of coil 100 causes armature 94 to open from contact Z, thereby de-energizing power supply 52 and hence terminating both the etching and the measuring processes by removing the operating potentials from electrodes 120 and 136.

To provide a visible indication of the thickness of the semiconductive body, the apparatus includes a peak-reading voltmeter 186 which is connected between probe 182 and semiconductive body 10, via tab 16. This voltmeter, in one form, may comprise a cathode-ray oscilloscope, to whose vertical deflection means the potential sensed by probe 182 is supplied, and in which the cathode-ray beam is swept horizontally at a rate which permits the display on the cathode-ray screen of at least one half-wave generated at the frequency of the alternating voltage supplied by source 44, and preferably of two or three such half-waves. The vertical scale of the oscilloscope screen may be calibrated in units of thickness which, for reasons discussed more fully hereinafter, is a determinable function of the voltage detected by probe 182. In addition, to provide an additional unambiguous indication of the inception of punch through, there may also be provided a second voltmeter 188, which may be either a peak-reading or an average-reading instrument, and which is connected between probe 182 and a probe 190 of similar construction arranged to encircle inner nozzle 22 of jet-forming nozzle 18. A sudden fall in the voltage indicated by voltmeter 188 is indicative of the inception of punch-through.

Since each of switches 116, 132, 168 and 174 is thrown to a first position during etching and to a second position during thickness measurement, it has been found convenient to gang the blades of these four switches so that they may be thrown simultaneously, and to effect throwing of them by means of a solenoid 192 having a coil 194 and an armature 196. When coil 194 is unenergized, the ganged blades of the four switches are in the positions shown in FIGURE 1 (i.e. the etching position), while when coil 194 is energized, the switches are closed to the alternate contacts shown (i.e. the thickness-measuring position).

Moreover, in order that the etching of body 10 may be terminated when its thickness has been reduced to within a predetermined tolerance of the desired value, it is desirable that thickness measurements be made at intervals which are spaced by a time less than that required to reduce the thickness of body 10 by an amount equal to the aforesaid tolerance. To this end, a timer 198 is provided which energizes coil 194 at predetermined time intervals, thereby throwing the blades of switches 116, 132, 168 and 174 to their respective "measurement" positions, and, after a time sufficient for the measurement has elapsed, de-energizes coil 194, thereby restoring the blades of the four switches to their "etching positions." Timer 198 is itself energized by source 44 via terminal Z. Thus, when process controller 102 de-energizes relay coil 100, it effects de-energization of timer 198 as well as of power supply 52, thereby preventing needless cycling of the positions of the four switches ganged to the armature 196 of solenoid 192.

The mode of operation of the arrangement of FIGURE 1 will now be reviewed. To connect the apparatus to voltage source 44, line-switch 48 is closed. Closure of this switch energizes time-delay relay 92 and certain elements of process controller 102, as well as pumps 26, 32 and 36 and light sources 146 and 148. It does not, however, energize power supply 52, nor can this equipment be energized until time-delay relay 92 actuates armature 88 to close against contact 90. This time delay is provided to permit the hydraulic system, the process controller and the light sources to attain their respective steady-state operating conditions before the entire apparatus is energized for etching and for measurement.

When the time delay interval has elapsed, relay 92 closes armature 88 to contact 90, and the etching-and-measuring cycle can now be initiated by momentarily closing switch 104. Closure of this switch energizes coil 100 of relay 96 to close armature 94 against contact Z, thus connecting source 44 to power-supply 52, process controller 102 and timer 198.

During the etching portion of the process, coil 194 of solenoid 192 is de-energized and switches 116, 132, 168 and 174 are consequently in the positions shown in the drawing. As a result, light sources 146 and 148 illuminate the surfaces of body 10, while a negatively-poled pulsating current of substantial intensity is supplied by power supply 52 to each of jets 12 and 14, thereby producing etching of body 10 at a substantial rate. In the preferred form shown, these current pulses are non-contemporaneous, with the result that, during each half-cycle of the alternating voltage supplied by source 44, one jet is maintained at a relatively small negative potential with respect to body 10 by D.-C. source 82, while the other jet has a negatively poled half-wave of sinusoidally varying voltage applied thereto. This time relationship between the respective voltages applied to the two jets is particularly useful during the measurement portion of the process.

The measurement portion of the prcoess is initiated when timer 198 energizes coil 194, thereby causing switches 116, 132, 168 and 174 to be thrown to their alternate positions. When these switches are thus positioned, shutters 154 are energized to cut off the illumination by lamps 152 of body 10, and the voltages developed at terminals 84 and 86 of power-supply 52 are supplied to jets 12 and 14, via high-valued resistors 128 and 144 respectively, at much lower current intensities than during etching. This lowering of the intensities of the currents flowing in jets 12 and 14, during the times when body 10 is unilluminated, prevents deleterious rough etching of the body at these times. Moreover, as discussed hereinafter, the high-valued resistors 128 and 144 additionally serve as voltage-limiting elements in the arrangement for ascertaining the value of the jet voltage, at a position adjacent body 10, for which punch-through occurs.

When body 10 is unilluminated, or is illuminated by light having only a low intensity, each of jets 12 and 14 forms a rectifying contact with the surface of body 10 impinged thereby. Moreover, because a negative potential is applied to each of these jets, this rectifying contact is reverse-biased. As a result, potential differences, whose values are substantial proportions of the values of the potentials applied to electrodes 120 and 136 respectively, are established between the respective jets and body 10.

Figure 2A:
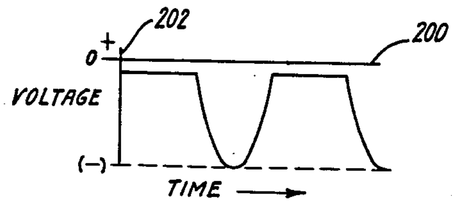
FIGURES 2A and 2B are graphical representations of signals produced by the apparatus of FIGURE 1.

In the arrangement of FIGURE 1, the instantaneous value of the potential difference applied between jet 14 and body 10 is sensed by probe 182 and is supplied via conductor 184 to voltmeter 186 and process controller 102. As an important aspect of the invent, the latter potential difference establishes, within body 10, a space-charge region whose depth is directly dependent on the value of this potential difference. So long as this space-charge region is insufficiently deep to extend from one etched portion on one surface of body 10 to another etched portion on the opposing surface thereof, the impedance between jets 12 and 14 is very high and relatively constant. As a result, the waveform of the potential difference detected by probe 182 is substantially that of the voltage supplied by terminal 86, i.e. it is a half-sinusoid. Such a voltage waveform is shown, for example, in FIGURE 2A, wherein the axis of abscissas 200 represents time and the axis of ordinates 202 represents the voltage sensed by probe 182 and displayed, substantially as shown, on the screen of the oscilloscope which may be utilized in this arrangement as voltmeter 186.

Figure 2B:
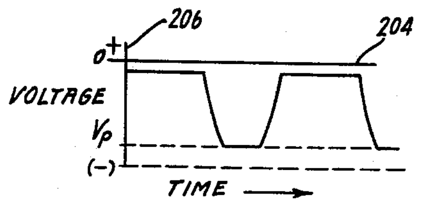

However, when the thickness between the etched regions of the body is sufficiently small that the space-charge region produced by the negative-going half-wave applied to jet 14 just extends from one jet-impinged surface to the other, i.e. punch-through begins, the value of the impedance between jets 12 and 14 falls sharply. As a result, the intensity of the current through jet 14 rises and, because of the high resistance of resistor 144, the voltage applied to jet 14 limits at the critical voltage value for which the fall in impedance occurs. Accordingly there appears, on the screen of the oscilloscope serving as voltmeter 186, a waveform of the form shown in FIGURE 2B, wherein the axis of abscissas 204 again represents time, the axis of ordinates 206 represents the value of the potential detected by probe 182, and the quantity $V_p$ represents the potential at which potential-limiting occurs. The limiting value $V_p$ of the voltage detected by probe 182 is itself dependent upon the punch-through voltage and therefore is indicative of the thickness of body 10 between jets 12 and 14. Accordingly, as a significant aspect of our invention, advantage is taken of this relationship between $V_p$ and the body thickness to terminate the etching of body 10 at precisely the desired value. Specifically, process controller 102 is constructed and arranged to de-energize relay 96, and hence terminate the etching-and-measuring cycles, when the peak value of the voltage sensed by probe 182 falls below that value corresponding to the desired thickness.

While, in the apparatus of FIGURE 1, jet 12 is arranged to be connected to power supply 52 via resistors 128 and 114 during the thickness measurement, it has been found in practice that, during this measurement, jet 12 may equally well be connected to body 10 or alternatively may be disconnected from all external sources of potential.

The relationship between body thickness and the voltage $V_p$, as predicted by solid-state theory and as determined by experiment, is considered hereinafter.

Thus far, the structure and functions of timer 198 and process controller 102 have been discussed only in general terms; these elements of our system are now considered in greater detail. In this regard, timer 198 may have any one of several conventional structures. For example, a particularly simple and reliable structure (not shown) comprises a single-pole, single-throw switch which is spring-loaded to a normally-open position and which, when closed, connects coil 194 of solenoid 192 to source 44 via terminal Z, thereby to energize coil 194. This spring-loaded switch may be actuated to a closed position, periodically and for a predetermined time interval, by means of a heart cam which is arranged to abut the actuating mechanism of the switch and is rotated at a predetermined angular velocity by means of a speed-adjusting gear train which itself is driven by an electric motor. The electric motor may also be energized by connecting it to source 44 via terminal Z.

Figure 3:
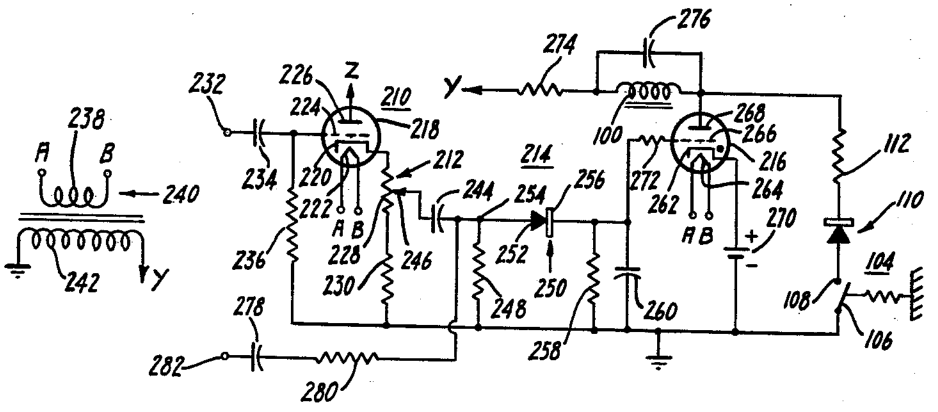
FIGURE 3 is the schematic diagram of electrical apparatus suitable for use in the arrangement of FIGURE 1.

Process controller 102 may also have any one of several structures, and for example may comprise the system shown in FIGURE 3. This system includes an input stage 210 having a high input impedance, by means of which the pulsating voltage sensed by probe 182 may be utilized without drawing such an amount of current through the probe circuit that the potential distribution in jet 14 and at the surface of body 10 is modified substantially thereby. The output voltage produced by input stage 210 is supplied, via a gain-controlling potentiometer 212, to a rectifying arrangement 214 which produces a unidirectional output voltage whose value is substantially equal to the peak value of the pulsating input voltage supplied thereto, i.e. arrangement 214 is a peak detector. This unidirectional output voltage is supplied in turn as a control signal to a grid-controlled gaseous rectifier 216. This rectifier, in turn, controls the energization of relay coil 100, maintaining this coil energized as long as the control signal exceeds a predetermined value, and de-energizing the coil when the value of the control signal falls below this predetermined value.

More particularly, input stage 210 may comprise an electron discharge tube 218 having a cathode 220 and a heater electrode 222 therefore, a control electrode 224 and an anode 226. Tube 218 may be connected in cathode-follower configuration, cathode 220 being connected to a point at ground potential via the resistance element 228 of potentiometer 212, and a fixed resistor 230, control electrode 224 being connected to an input terminal 232 via a coupling capacitor 234 and to a point at ground potential via a coupling resistor 236, and anode 226 being connected to source 44 via terminal Z (see FIGURE 1). The terminals of heater electrode 222 may be connected respectively to terminals A, B, of the secondary winding 238 of a filament transformer 240, one terminal of whose primary winding 242 is connected to a point at ground potential, and the other terminal of whose primary winding 242 is connected to source 44 via terminal Y (see FIGURE 1).

Rectifying arrangement 214 may comprise a coupling capacitor 244 connected in series relationship with the movable arm 246 of potentiometer 212 and with a coupling resistor 248 connected to a point at ground potential. The arrangement may include, in addition, a unidirectional conductor 250 whose anode 252 is connected to the junction 254 of capacitor 244 and resistor 248 and whose cathode 256 is connected to a point at ground potential via a timing circuit comprising a resistor 258 and a capacitor 260 connected in shunt. The values of resistor 258 and capacitor 260 are such that the timing circuit has a time constant for which the arrangement 214 provides peak detection at the frequency of source 44.

Grid-controlled gaseous rectifier 216 may comprise a cathode 262 and a heater 264 therefor, a grid 266 and an anode 268. Cathode 262 of this rectifier may be connected to a point at ground potential by way of a source 270 of a positive biasing voltage; grid 266 may be connected, via a current-limiting resistor 272, to cathode 256 of unidirectional conductor 250, while anode 268 may be connected to terminal Y (see FIGURE 1) by way of coil 100 of relay 96 and a current-limiting resistor 274. In addition, coil 100 may have a by-pass capacitor 276 shunted thereacross to minimize relay chatter. To energize heater 264, the terminals thereof are respectively connected to terminals A and B of filament transformer 240.

The system of FIGURE 3 also includes a second input circuit comprising a coupling capacitor 278 and a voltage-dividing resistor 280 connected in series relationship, and in the order named, between a second input terminal 282 and anode 252 of unidirectional conductor 250. In the arrangement shown, probe 182 is connected to input terminal 232, thereby to supply to process controller 102 the voltage sensed by the probe, while blade 176 of switch 174 is connected to input terminal 282, supplying thereto a holding signal from source 44 during the etching portion of the process. In addition, and as discussed hereinbefore, process controller 102 has associated therewith an arrangement for initially energizing relay coil 100, namely resistor 112, rectifier 110 and momentary-contact switch 104 connected in series relationship between coil 100 and a point at ground potential..

The operation of the system of FIGURE 3 will now be considered in detail. When the apparatus of FIGURE 1 is initially energized by closing line-switch 44, the heaters 222 and 264 of tubes 218 and 216 respectively are supplied with voltage. However, the anode 226 of input tube 218 remains de-energized, and accordingly controller 102 is inoperative, until relay 96 is actuated by closing momentary-contact switch 104. To allow sufficient time for the cathodes of tube 218, and particularly of gas tube 216, to attain their proper operating temperatures before these tubes are made to conduct anode current, switch 104 is preferably closed only after time-delay relay 92 has closed armature 88 against contact 90.

As aforementioned, during thickness measurement, a rectifying contact is established between jet 14 and body 10. When body 10 is sufficiently thick so that punch-through does not occur even at the maximum value of the voltage applied to the jet, substantially this maximum voltage is sensed by probe 182 and is applied to terminal 232 of the controller 102. This voltage is reproduced across resistive elements 228 and 230 of cathode follower 210 and a portion thereof having an amplitude determined by the position of movable arm 246 is supplied to peak-detector 214. In response to the voltage supplied by cathode follower 210, detector 214 supplies to grid 266 of gas tube 216 a positive voltage having an amplitude substantially equal to the peak value of the pulsating voltage supplied by the cathode follower. By including fixed resistor 230 in the cathode circuit of cathode follower 210, an input voltage is always supplied to detector 214, prior to punch-through, whose value is sufficiently high to produce, at grid 266 of gas tube 216, a voltage exceeding the ionization potential of tube 216 as established by the value of the cathode bias potential and the anode potential thereof. As a result, tube 216 ionizes during each positive half-cycle of the alternating voltage supplied to its anode from source 44, de-ionizing during each negative half-cycle of this alternating voltage. Accordingly, a unidirectional current flows through coil 100 of relay 96, whose intensity is sufficient to maintain armature 94 closed against contact Z.

When the thickness of body 10 is reduced to an extent such that punch-through occurs, probe 182 senses and transmits to terminal 232 a clipped voltage having a peak value which corresponds to the punch-through potential and, importantly, is smaller than the value of the unclipped half-wave previously transmitted by probe 182. As body 10 becomes increasingly thin as the result of etching, the measured potential becomes increasingly small, so that an increasingly small positive potential corresponding to this measured potential is applied by detector 214 to grid 266 of gas tube 216. When the potential of this grid falls below a critical value which may be approximately equal to the cathode bias of tube 216, tube 216 no longer re-ionizes after the succeeding negative half-cycle of the alternating voltage applied to its anode 268, and coil 100 of relay 96 is consequently de-energized. The value of punch-through voltage corresponding to this critical condition, and hence the thickness to which body 10 is etched, is established by adjusting the setting of the movable arm 246 of potentiometer 212. When relay coil 100 is de-energized (see FIGURE 1), the armature 94 opens from contact Z. As a result, the anode 226 of cathode-follower tube 218 is de-energized, thereby minimizing the possibility of a spurious reactuation of gas tube 216. However, to maintain controller 102 in a condition to be operative immediately after the process is re-initiated by closing switch 104, the heaters 222 and 264 of tubes 218 and 216 respectively are maintained energized.

During the etching intervals of our process, the surfaces of body 10 are illuminated by light sources 146 and 148, and as a result the rectifying properties of the respective interfaces between jets 12 and 14 and body 10 deteriorate markedly. Consequently, the voltage transmitted by probe 182 to input terminal 232 falls to a very small value which is insufficient to produce, at grid 266 of gas tube 216, a positive voltage of amplitude sufficient to maintain this tube ionized and relay coil 100 energized. Therefore, to maintain tube 216 ionized and coil 100 energized during etching, a holding signal is supplied to controller 102 during this interval. This holding signal is an alternating voltage supplied by source 44 to input terminal 282 via terminal Z, contact 178 and switch blade 176 (see FIGURE 1). This holding signal develops, at the output of peak detector 214, a positive voltage whose value exceeds that required to ionize tube 216. Consequently, relay coil 100 is maintained energized throughout the etching intervals of our process. During the measuring intervals thereof, switch 174 is opened, removing the holding voltage from input terminal 282. Under these condition, the only input signal supplied to controller 102 is the voltage sensed by probe 182.

It is to be understood that the method according to our invention may be practiced non-automatically, i.e. without either a process controller or a timer. More particularly, body 10 may be alternately etched, and its thickness measured, by cyclically and manually throwing switches 116, 132, 168 and 174 from their "etch" to their "measurement" positions. The thickness of the etched portion of body 10 may be monitored by observing the voltage indicated by voltmeter 186, and the process may be terminated by manually opening line switch 48 when the reading of voltmeter 186 indicates that the thickness of the etched region of body 10 has attained the desired value.

While we do not wish to be bound by the specific details of any theory, the following theoretical considerations are set forth in order that the invention and its modes of application may be fully understood.

As has already been mentioned, the technique of measurement used in the method according to our invention is believed to be grounded upon the phenomenon of punch-through, a theoretical discussion of which is found in the publication, Physical Review, vol. 90, No. 5, June 1, 1953, in the papers, "Space-Charge Limited Emission in Semiconductors," by W. Shockley and R.C. Prim, starting at page 753, and "Space-Charge Limited Hole Current in Germanium," by G. C. Dacey, starting at page 759. As pointed out in these articles, when a semiconductive device, comprising a semiconductive body having a rectifying contact applied to one surface thereof and a source of minority carriers applied to an opposing surface thereof, has a reverse-biasing potential applied to this rectifying contact, there is produced within the semiconductive body a region containing substantially no mobile charge carriers but containing in their stead a substantial space charge produced by the presence of ionized, immobile donor or acceptor impurities. This space charge produces a substantial electric field within the semiconductive body, whose sense is such as to impel minority carriers toward the rectifying contact. As the voltage applied to the rectifying contact is increased, the space-charge region extends deeper within the body, and approaches nearer to the aforesaid opposing surface, to which the source of minority carriers is applied. When the voltage applied to the rectifying contact reaches a critical value, this space-charge region extends completely through the body from the rectifying contact to the source of minority carriers applied to the opposing surface of the body. This extension of the space charge from one surface of the body to the other is termed punch-through.

When punch-through occurs, the electric field produced by the space charge also extends through the body from the rectifying contact to the source of minority carriers, in a sense such as to urge minority carriers into the body and to accelerate them toward the rectifying contact. Accordingly, the manner in which minority carriers supplied by the source travel through the semiconductive body to the rectifying contact then changes suddenly from one including a relatively slow diffusion process to another involving continual acceleration of these carriers by the field. As a result of these changes in the mechanism of carrier transport through the body, the intensity of the current flowing through the rectifying contact rises sharply, and the impedance between the source of minority carriers and the rectifying contact falls sharply. The voltage at which punch-through occurs is determined, for each semiconductive material, primarily by the resistivity of the semiconductive body and by its thickness and, since the resistivity of the body is substantially invariant at a given temperature, the punch-through voltage serves as a reliable measure of the thickness.

Figure 4:
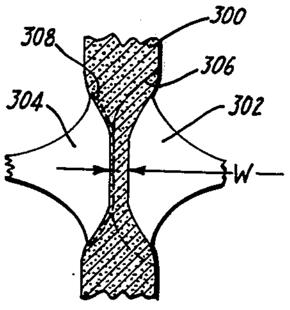
FIGURE 4 is a diagram, and FIGURE 5, a graphical representation, to which references are made in discussing the theoretical considerations relevant to the invention.

Such a condition of punch-through is represented in FIGURE 4, wherein the semiconductive body is diagrammatically represented by the cross-sectioned portion 300. The rectifying contact mentioned above is formed at the region of impingement of a jet 302 with a surface of body 300, and the source of minority carriers is a region of impingement of another jet 304 with an opposing surface of the body. The depth W of the space-charge layer produced by applying a back-biasing potential between jet 302 and body 300 is indicated by a dashed line 306. Also indicated by a dashed line 308 is a small depletion region produced by applying a small back-biasing potential between body 300 and jet 304. The dashed lines 306 and 308 are substantially coincident along a line parallel to the etched surface, indicating that punch-through has taken place.

According to solid-state theory, the depth of the space-charge region produced by a back-biasing voltage applied across a sharply defined rectifying junction varies substantially in direct proportion to the square root of the product of the voltage applied across the junction and the resistivity of the material constituting the semiconductive body. However, in experiments performed utilizing the arrangement of FIGURE 1, the relationship between the thickness of body 10 and the voltage measured by probe 182 has been found to be a more nearly linear one which, for a given value of this measured voltage, indicates a value of thickness smaller than that predicted by the aforementioned square-root relationship. While the reasons for this discrepancy from the theoretically predicted relationship are not fully understood, the discrepancy is believed to be attributable to phenomena taking place at or near the interface between the jet and the semiconductive body, which are not considered in deriving the square-root relationship.

More particularly, when an electrolytic jet is utilized to provide a rectifying junction at the surface of a semiconductive body, there is established, at and adjacent the electrolyte-semiconductor interface, a region of relatively high and variable resistance across which a substantial and variable voltage drop occurs during the thickness measurement. This resistance, which is to be distinguished from and is in addition to the resistance of the rectifying junction, may be produced by several factors, among which appear to be the appreciable depletion of ionic carriers in the vicinity of the electrolyte-semiconductor interface, and the production of an interfacial layer of an oxide which is a relatively poor conductor having a non-linear resistivity. Because of the substantial value of the voltage drop across this additional resistance, the voltage which is applied across the rectifying junction is substantially smaller than the voltage which is applied between the jet and the semiconductive body. As a result, the space-charge region which is formed within the semiconductive body by the voltage supplied to the jet is substantially shallower than that which would be formed if this entire voltage appeared across the rectifying junction. Moreover, because this additional resistance is non-linear, the type of functional relationship between body thickness and applied voltage is modified from the square-root relationship to one which, in this instance, approaches linearity. Nonetheless, the appropriate empirical relationship between the depth of the space-charge region and the voltage applied between jet and body is accurately determinable for each pair of semiconductive material and electrolyte, and accordingly, our novel method for producing a body of predetermined thickness is a thoroughly practicable and commercially useful one.

Figure 5:
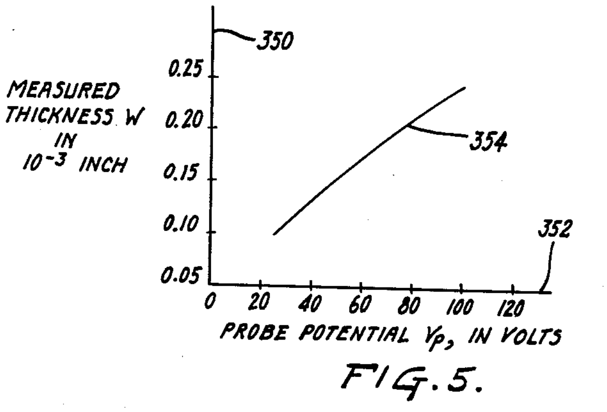

For example, FIGURE 5 is a graphical representation of one such empirical relationship obtained by utilizing the apparatus of FIGURE 1. In this graphical representation, the axis of ordinates 350 represents the micrometrically measured thickness W of body 10 in the region bounded by the respective areas of impingement of jets 12 and 14, while the axis of abscissas 352 represents the peak voltage $V_p$ measured by probe 182 and corresponding to the occurrence of punch-through. Curve 354 represents the empirical relationship between thickness W and voltage $V_p$. This empirical relationship is an almost linear one and accordingly may be expressed approximately by the mathematical relationship:

$$W=(2V_p/\text{volt}+50)\times10^{-6}\text{ inch}$$

where $V_p$ lies between 25 and 100 volts.

This relationship was determined under the following experimental conditions:

| | |
|---|---|
| Semiconductive material of which body 10 is constituted | 4 ohm-centimeter n-type germanium. |
| Composition of solution 28 | Aqueous solution of nitric acid, having a normality of 0.24. |
| Rate of efflux of solution 28 from each of jets 12 and 14 | 1 cubic centimeter per minute. |
| Description of the area of body 10 impinged by each jet | A substantially circular area having a diameter of about 0.018 inch. |
| Distance of probe 182 from body 10, before etching | About 0.125 inch. |
| Maximum voltage measured by probe 182 during measuring portion of process | About 100 volts. |
| Peak intensity, before punch-through, of the current flowing in jet 14, corresponding to a peak voltage of 100 volts as measured by probe 182 | 200 microamperes. |
| Peak output voltage developed at each of terminals 84 and 86 of power supply 52 | 500 volts. |
| Voltage supplied by source 82 | 1.5 volts. |
| Average intensity of jet current during etching | About 1 milliampere. |
| Values of rheostats 114 and 130, respectively | About 66 thousand ohms. |
| Values of resistors 128 and 144, respectively | About 1 million ohms. |

It is to be understood that the foregoing values of the parameters of our system of FIGURE 1 are merely exemplary, and that we do not intend to limit our invention thereto.

When the arrangement of FIGURE 1 is operated under the foregoing conditions, an unambiguous and accurate measure of the thickness of a semiconductive body is obtainable over a substantial range of thicknesses, by utilizing the punch-through phenomenon. However, as is well-known in the art, there exist phenomena in addition to punch-through which may occur when back-biasing voltages of sufficiently high values are applied across rectifying barriers and which, if they occur, will also produce rises in the intensities of currents flowing across these barriers. Such rises in current intensity resulting from these additional phenomena would be undesirable in the present application inasmuch as they would make ambiguous the thickness measurement according to our invention. Accordingly, it is to be understood that voltages having values less than those causing these undesired phenomena are to be employed in practicing our invention.

Our method may be practiced in numerous additional arrangements which differ specifically from the arrangement of FIG. 1. Five of these many arrangements are shown schematically in FIGURES 6, 7, 9 10 and 11 respectively, to which figures reference is now made.

Figure 6:
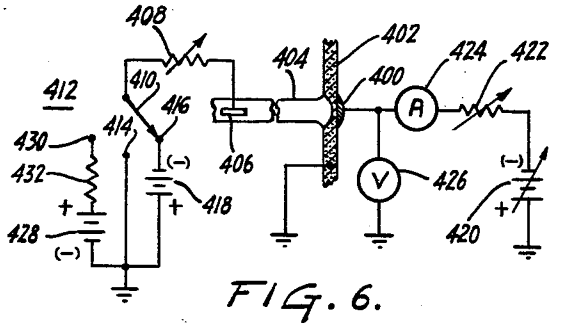
FIGURES 6 and 7 are schematic diagrams of additional arrangements suitable for practicing the method of our invention.

Referring first to FIGURE 6, it is seen that the arrangement of this figure differs from that of FIGURE 1 primarily in the substitution of a dry, metalic rectifying contact for one of the electrolytic jets. More particularly, a metallic rectifying contact 400 is applied to one surface of a semiconductive body 402, while to the other surfaces thereof, an electrolytic jet 404 is applied. In one arrangement, body 402 may be constituted of n-type germanium, contact 400 may be constituted of the metal indium and may be applied by utilizing one of the jet electrolytic plating techniques described and claimed in the copending patent application Serial No. 472,824 of J. W. Tiley and R. A. Williams, filed December 3, 1954, entitled "Semi-conductive devices and Methods for the Fabrication Thereof," and assigned to the assignee of the present application, and jet 404 may be constituted of a dilute aqueous solution of nitric acid. As in the arrangement of FIGURE 1, semi-conductive body 402 is connected ohmically to a point at ground potential, and an electrode 406, which may be constituted of an inert metal such as platinum, is immersed in jet 404. This electrode is connected, via a current limiting resistor 408, to the blade 410 of a single-pole, triple-throw switch 412, one fixed contact 414 of which is connected to a point at ground potential and another fixed contact 416 of which is connected to a source of negative potential 418.

In addition, rectifying electrode 400 is supplied with a variable negative potential from a source 420, by way of a current-limiting resistor 422 and an ammeter 424. The potential of rectifying contact 400 with respect to that of body 402 is monitored by a voltmeter 426.

In order to produce etching of body 402, the blade 410 of switch 412 is closed to contact 416, thereby to supply a negative potential to electrode 406. In addition, as in the arrangement of FIGURE 1, light is directed onto the surface of body 400 to be etched, thereby to promote generation of holes thereon. Moreover, to prevent withdrawal of these holes by electrode 400, the value of the voltage supplied by source 420 is reduced to a small value.

In order to measure the thickness of body 402 in the region bounded by rectifying contact 400 and jet 404, jet 404 may first be established at the potential of body 402 by throwing blade 410 of switch 412 from contact 416 to contact 414. Alternatively, and as mentioned with regard to the arrangement of FIGURE 1, jet 404 may be isolated from all external sources of voltages. Then, as in the arrangement of FIGURE 1, the light irradiating body 402 is obscured, and the value of the output voltage of source 420 is varied within a range of voltages whose maximum value is less than that required to produce the aforementioned spurious breakdown phenomena within body 402.

As discussed above, the thickness of the body is indicated by the value of the potential difference between rectifying contact 400 and semiconductive body 402 at which punch-through begins, and the inception of punch-through is manifested by a sudden rise in the value of the current indicated by ammeter 424, as well as by an indication by voltmeter 426 that voltage-limiting is taking place. In the present instance, the quantitative relationship between the thickness of body 402, in the region bounded by contact 400 and the area of impingement of jet 404, and the potential difference between contact 400 and body 402 at which punch-through begins, corresponds more closely to the aforementioned square-root relationship between body thickness and punch-through voltage than does the aforementioned empirical relationship obtained for the arrangement of FIGURE 1. This closer correspondence occurs because of the more intimate physical bonding of contact 400 to body 402, and the much lower resisitivity of the metal from which contact 400 is fabricated.

In a further aspect of the method of our invention, the rectifying barrier, which must be present in the etched surface in order to make the punch-through measurement, may be produced, during each measurement interval, by electroplating a metallic rectifying contact onto the etched surface. Electrical connection may then be made to this metallic contact by way of the electrolytic solution, and the punch-through measurement performed in the manner just described. The measurement having been made, the etching of the body may then be resumed; during this etching, the metallic contact is removed from the etched surface. The arrangement of FIGURE 6 may readily be adapted for carrying out this form of our method by connecting a source of positive potential 428 to the third fixed contact 430 of switch 412, by way of a current-limiting resistor 432. In addition, to provide the metallic ions necessary for electroplating, the electrolytic solution constituting jet 404 may be changed from an aqueous solution of nitric acid to, for example, an aqueous solution containing indium trichloride to a normality of 0.09 and hydrochloric acid in an amount sufficient to establish the pH of the solution at 1.5.

To produce etching of body 402 by jet 404, light is directed onto the surface to be etched, switch blade 410 is closed to contact 416, and the value of the output voltage of source 420 is reduced to a small value, as aforedescribed. To perform the punch-through measurement, the illumination is removed from body 402 as in each of the preceding cases. However, in contrast to the aforedescribed forms of the method, a positive potential is now applied to jet 406 by closing switch blade 410 to contact 430. As a result of the application of this positive potential, a deposit of indium metal is laid down on the region of body 402 impinged by jet 404. After a thin layer of indium has been deposited, the plating is discontinued by throwing switch blade 410 to contact 414, thereby removing the positive potential from electrode 406 and connecting this electrode to body 402. The punch-through measurement is performed by varying the value of the voltage supplied by source 420 over an appropriate range, as hereinbefore set forth.

It will be clear to those skilled in the art that the apparatus shown in FIGURE 6 may be arranged for automatic operation by utilizing additional apparatus similar to that shown in FIGURE 1, e.g. by providing a process controller responsive, during measurement intervals, to the voltage of electrode 400 to de-energize the process when the peak value of this voltage falls below a critical value, and a timer arranged to throw switch blade 410 and to vary the value of the output voltage of source 420, at appropriate times.

Figure 7:
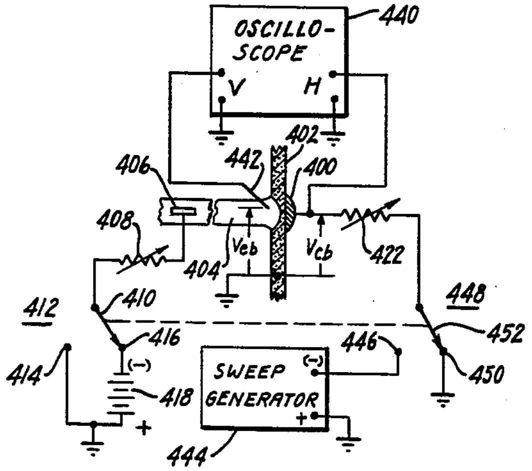

Moreover, in view of the foregoing discussion, it will also be clear that the value of the back-biasing voltage for which punch-through occurs may be ascertained by utilizing measuring techniques other than those specifically described hereinbefore. In this regard, reference is now made to FIGURES 7 and 8 of the drawing. FIGURE 7 is a schematic diagram of an arrangement similar to that illustrated in FIGURE 6; accordingly, the elements common to the two arrangements are designated by the same numerals. In the arrangement of FIGURE 7, the punch-through indicating instruments of FIGURE 6, i.e. ammeter 424 and voltmeter 426, are replaced by an oscilloscope 440 to whose horizontal deflection means is applied the potential difference, $V_{cb}$, between metallic rectifying contact 400 and body 402, and to whose vertical deflection means is applied the potential difference, $V_{eb}$, between jet 404 and body 402, as detected by a probe 442 immersed in jet 404 adjacent the surface of body 402 impinged by the jet. Oscilloscope 440 may be of conventional form, while probe 442 may have a structure similar to that of probe 182 included in the arrangement of FIGURE 1.

In addition, source 420 has been replaced by a sweep generator 444, one output terminal of which is connected to a point at ground potential and the other output terminal of which is connected to a fixed contact 446 of a single-pole, double-throw switch 448, whose other fixed terminal 450 is connected to a point at ground potential and whose switch blade 452 is connected to rectifying contact 400 via resistor 422. Switch blade 452 is mechanically ganged to switch blade 410 of switch 412 in a manner such that, when blade 410 is closed to contact 416, blade 452 is closed to contact 450, while, when blade 410 is closed to contact 414, blade 452 is closed to contact 446. Sweep generator 444, which may be of conventional form, is constructed and arranged to produce, at terminal 446, a periodic voltage of negative polarity, the amplitude of which varies between zero and a maximum value which is less than the value producing the aforementioned undesired breakdown phenomena within body 402, when applied between contact 400 and semiconductive body 402. Typically this voltage may have a triangular or sawtooth waveform; however, the precise waveform of this voltage is unimportant, and for example may equally well be sinusoidal.

Figure 8:
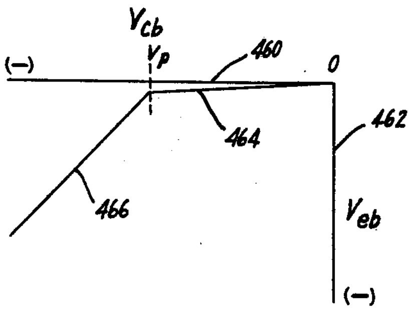
FIGURE 8 is a graphical representation to which reference is made in discussing the operation of the arrangement of FIGURE 7.

In practicing this form of our method, etching is produced by closing switch blade 410 to contact 416 and switch blade 452 to contact 450, and by shining light onto the surface of body 402 to be etched. Under these conditions, contact 400 is maintained substantially at ground potential, while a negative etching potential is supplied to jet 404 by source 418. To perform a thickness measurement, switches 412 and 448 are thrown to their alternate positions, i.e. switch blade 410 is closed to contact 414 while switch blade 452 is closed to contact 446. Under these conditions, jet 404 is connected to a point at ground potential by way of electrode 406 and resistor 408, while contact 400 is supplied with the periodically-varying output voltage of sweep generator 444. In the event that the thickness of body 402 between contact 400 and jet 404 is sufficiently small that the voltage $V_p$ required to produce punch-through is less than the maximum value of the sweep voltage supplied by generator 444, an oscilloscopic display similar to that illustrated in FIGURE 8 is obtained. From this display, the value of $V_p$ is readily obtained.

More particularly, in the graphical representation of FIGURE 8, the axis of abscissas 460 represents the amplitude of the voltage $V_{cb}$ between rectifying contact 400 and body 402, while the axis of ordinates 462 represents the value of the voltage $V_{eb}$ detected by probe 442. The values of $V_{eb}$, produced in response to those values of $V_{cb}$ which are less than the value $V_p$, are indicated by line-segment 464, while the values of $V_{eb}$, produced in response to those values of $V_{cb}$ exceeding $V_p$, are indicated by line-segment 466. From the foregoing discussion, it will be understood that, for values of $V_{cb}$ below that producing punch-through, the impedance between contact 400 and jet 404 is very high, and accordingly the voltage applied to contact 400 has little influence on the voltage of jet 404, as is indicated by the negligible slope of line-segment 464. However, for values of $V_{cb}$ equal to or greater than $V_p$, punch-through occurs and the impedance between contact 400 and jet 404 becomes relatively small. As a result, the voltage $V_{eb}$ of jet 404 tends to follow closely the voltage $V_{cb}$ of contact 400, as indicated by the substantial slope of line-segment 466. Because the slope of the $V_{cb}$—$V_{eb}$ curve changes sharply at $V_p$, this form of oscilloscopic display provides an excellent means for ascertaining the value of $V_p$. In this regard, it is feasible to calibrate the axis of abscissas directly in terms of thickness, and to ascertain the thickness of body 402 merely by reading the value of the abscissa for which the oscilloscopic trace changes its slope suddenly.

Figure 10:
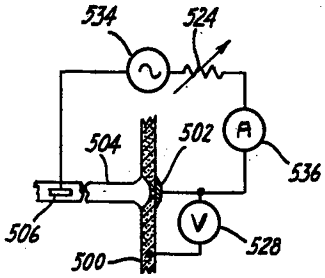
FIGURES 9, 10 and 11 are schematic diagrams of still further arrangements suitable for practicing our method.
Figure 9:
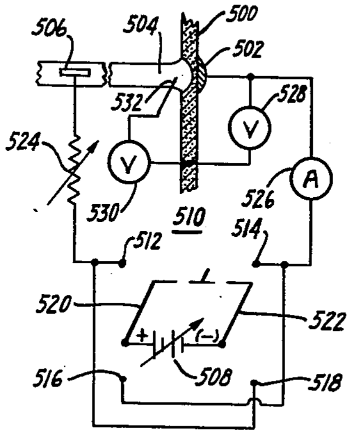
Figure 11:
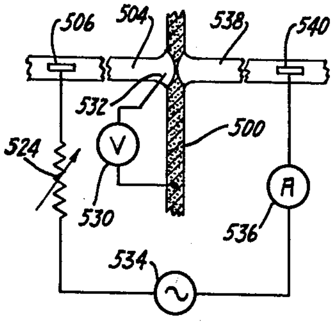

Referring now to FIGURES 9 to 11, it is seen that each of the arrangements shown in the latter figures differs specifically from the arrangements shown in FIGURES 1, 6 and 7 in that the energizing potentials are applied solely between the means for providing a rectifying contact and the electrically-conductive etching means, rather than between each of these elements and the semiconductor body. Thus, in the arrangements of FIGURES 9 to 11, the potential of the semiconductive body is determined by the value and sense of the potential difference applied between the two means making connections thereto, as well as by the resistivity of the semiconductive body and the value of the resistance between the body and each means.

More particularly, in FIGURE 9 there is provided an arrangement comprising a semiconductive body 500, to one surface of which is applied a metallic rectifying contact 502, and to an opposing surface of which is applied an electrolytic jet 504. As in the preceding cases, body 500 may be constituted of n-type germanium, contact 502 may be constituted of indium, and jet 504 may be constituted of a dilute aqueous solution of nitric acid. Electrical connection is made to the electrolytic jet by means of an inert electrode 506.

The potentials required to energize the process are supplied by a source of variable potential 508 which is connected to the appropriate electrodes by way of a double-pole, double-throw switch 510. This switch comprises a first pair of fixed contacts 512 and 514 respectively, a second pair of fixed contacts 516 and 518 respectively, and ganged blades 520 and 522 respectively, and is arranged as a polarity-reversing device. Specifically, the positive pole of source 508 is connected to blade 520 and the negative pole thereof is connected to blade 522, contact 512 is connected to contact 518, and contact 514 is connected to contact 516. In addition, inert electrode 506, which is located in the jet stream, is connected to contact 512 by way of a current-limiting resistor 524 while rectifying contact 502 is connected to contact 514 by way of an ammeter 526. The voltage of rectifying contact 502 with respect to body 500 is indicated by a voltmeter 528, while the voltage of jet 504 is indicated by a voltmeter 530 connected to jet 504 by way of a probe 532 which may have a structure similar to that of probes 182 and 190 of the arrangement of FIGURE 1.

To produce anodic etching of body 500, the surface thereof impinged by jet 504 is irradiated with light, and blades 520 and 522 of switch 510 are closed respectively to contacts 516 and 518. Under these conditions, the negative pole of source 508 is connected to electrode 506 while the positive pole of this source is connected to rectifying contact 502. As a result, contact 502 is biased in the sense of easy conduction while jet 504 is biased in the sense of difficult conduction, with respect to body 500. Consequently, body 500 has a potential considerably positive with respect to that of jet 504, and as a result, the body is etched anodically by this jet.

To determine the thickness of body 500, it is only necessary to remove the illumination from the body, thereby to permit a rectifying contact to form over the region of body 500 impinged by jet 504, and to vary the value of the voltage supplied by source 508, within a voltage range whose maximum value is below the voltages producing the aforementioned spurious breakdown phenomena. As in all of the embodiments of the invention, the thickness of body 500 is indicated by the value of the voltage at which punch-through begins. In the present instance, the inception of punch-through produces a sudden rise in the intensity of the current flowing through resistor 524 and indicated by ammeter 526, hence limiting the value of the potential difference detected by probe 532 and indicated by voltmeter 530. The value of the latter potential difference indicates the thickness of the body.

Alternatively, in making the thickness measurement, metallic contact 502 may be utilized in place of jet 504 as the means providing the rectifying contact which, when back-biased, produces a space-charge region within body 500. To utilize contact 502 in this manner, it is only necessary to connect the negative pole of source 508 thereto, and to connect the positive pole of this source to electrode 506. These connections may be achieved merely by throwing switch 510 so that blades 520 and 522 close to contacts 512 and 514, respectively. The value of the voltage provided by source 508 is then varied until punch-through occurs. In this arrangement, the voltage indicative of the thickness of body 500 is that indicated at punch-through by voltmeter 528.

The arrangements of FIGURES 10 and 11 differ from all of the preceding arrangements in that alternating voltage is used to energize our process. In these two figures, those structures which are identical to structures shown in FIGURE 9 are numbered identically therewith.

Referring now more particularly to FIGURE 10, a source of alternating voltage 534 is provided, one terminal of which is connected to inert electrode 506 and the other terminal of which is connected to rectifying contact 502 via current-limiting resistor 524 and an ammeter 536. Voltmeter 528 is connected between contact 502 and an ohmic contact applied to body 500, as in the preceding embodiment. When anodic etching by jet 504 is desired, the surface of body 500 impinged by jet 504 is irradiated with light. Etching of this surface then takes place during those half-cycles of the alternating voltage supplied by source 534 for which electrode 506 is negative with respect to rectifying contact 502. When a measurement of thickness of body 500 between jet 504 and contact 502 is desired, it is only necessary to remove the illumination from body 500, and then to observe the magnitude of the voltage applied between the contact 502 and body 500 for which punch-through begins. As in the preceding arrangements, punch-through produces a sudden rise in the current indicated by ammeter 536, as well as a limiting in the value of the voltage applied between rectifying contact 502 and body 500.

Similarly, and as shown in FIGURE 11, our process may be practiced by applying an alternating voltage between two jets which impinge opposing surfaces of semiconductive body 500. Thus, in the present arrangement, the rectifying contact 502 of FIGURES 5 and 6 is replaced by an electrolytic jet 538 in which is immersed an inert electrode 540, and the system is energized by connecting source 534 between electrodes 506 and 540, by way of current-limiting resistor 524 and ammeter 536. The etching of body 500 and the measurement of its thickness may be performed in the manner described in connection with the arrangement of FIGURE 8, and the voltage indicative of thickness may be read from voltmeter 530.

While we have described our invention in each case with respect to an n-type semiconductive body, it will be clear to those skilled in the art that this invention is equally applicable to etching p-type semiconductive bodies to predetermined thicknesses. As in the case of n-type bodies, etching is accomplished by applying an etching potential to an electrolytic jet impinging a surface of the body. However, in contrast to the case of the n-type body, it is not necessary to the etching process that the p-type body be irradiated with light.

To measure the thickness of a p-type body, it is necessary, in accordance with our invention, to establish a second rectifying contact at a surface of the semiconductive body opposing the surface to which the jet is applied. As in the previously described arrangements, this contact may be provided by a jet or a metallic contact, and the measurement of thickness may be made by applying a reverse-biasing potential to one of the rectifying contacts and determining the value of this potential for which punch-through occurs. In the present instance, a reverse-biasing potential is one which establishes the rectifying contact at a potential positive with respect to the semiconductive body. By contrast, the etching potential may be one whose polarity is opposite to that of the reverse-biasing potential. Accordingly, the arrangements of FIGURES 8 and 9, which are energized by an alternating voltage, are particularly well suited for carrying out automatically the process of our invention on p-type bodies, when these arrangements are modified in the manner now described.

More particularly, in the arrangements of FIGURES 10 and 11, the amplitude of the alternating voltage supplied by source 534 may be established at a value for which punch-through just begins when the thickness of the body has been reduced to precisely the desired value. In addition, apparatus (not shown) may be provided which is responsive to a sudden rise in the intensity of the current supplied by source 534, to disconnect the source from contact 506, thereby to terminate etching. In contrast to the preceding specifically described arrangements, no light is applied to body 500 at any time.

In operation, during each half cycle of the source voltage, one of the two rectifying electrodes is biased reversely, while the other is biased forwardly. The potential difference established between the reversely-biased electrode and the body produces, within the p-type body, a space-charge region whose instantaneous depth depends on the instantaneous value of this potential difference, while the potential difference applied between the forwardly-biased electrode and the body causes anodic etching of the body in those instances when the rectifying contact is established by a jet. When the body has been etched to that critical value of thickness for which the peak value of the alternating voltage produces punch-through, a sudden rise occurs in the intensity of the current supplied by source 534. Manual or automatic means responsive to this rise in current intensity may be used to disconnect source 534 from electrode 506, thereby de-energizing the etching process just at the moment when body 500 is excavated to the desired thickness.

In each of the foregoing arrangements, the rectifying barrier which opposes the barrier established by the etching means has been produced at a surface of the semiconductive body. However, it is not essential to the method of our invention that this barrier be produced at a surface. On the contrary, the barrier may be established relatively deeply within the body, for example by forming an alloy junction therewithin by conventional techniques. Under these conditions, the thickness which may be accurately established by practicing our novel method is that between this internal rectifying barrier and the surface of the semiconductive body which is being etched. It will be appreciated that such a technique is particularly useful in the fabrication of transistors of the type including at least one junction within the body, and in which a base region of accurately established thickness is desired.

While we have described our invention by means of specific examples and in specific embodiments, we do not wish to be limited thereto, for obvious modifications will occur to those skilled in the art without departing from the scope of our invention.

We claim:

In a method for producing a region of specific thickness in a body of n-type semiconductive material, the steps of: applying to respective opposing surfaces of said body first and second coaxially-arranged jets of an electrolytic solution forming a rectifying barrier in each of said respective surfaces on which said jets are incident when light concurrently incident on said surfaces has an intensity less than a particular amount; applying to said first jet by way of a first resistive element a first potential negative with respect to the potential of said body and having a periodically-varying amplitude, said amplitude having a substantially constant value during a first interval of said period and varying between said constant value and a larger value during the remainder of said period, and applying to said second jet by way of a second resistive element a second potential negative with respect to said potential of said body and having a periodically varying amplitude, the amplitude of said second potential having a substantially constant value during said remainder of said period and varying between the last-named value and a larger value during said first interval of said period; during a first group of time-spaced intervals each longer than said period irradiating each of said surfaces with light the intensity of which is at least equal to said particular amount, thereby to promote the electrolytic etching of each of said surfaces by said jets in response to said potentials applied thereto; during a second group of time-spaced intervals intermediate said first group and each longer than said period, increasing the respective values of said first and second resistive elements and reducing said intensity of said light below said particular amount thereby to permit formation of rectifying barriers in said opposing surfaces of said body respectively impinged by said two jets, the impedance between said two barriers for each thickness of said semiconductive material therebetween having a first magnitude when said potential applied to one of said jets is less than a particular value characteristic of said each thickness and having a second magnitude considerably less than the first magnitude when said potential applied to said one jet is equal to said particular value, said constant value of each of said potentials being less than said particular value characteristic of said specific thickness and said larger value of said potential applied to said one jet exceeding said particular value characteristic of said specific thickness; sensing during each interval of said second group the potential of said one jet for which said impedance abruptly changes from said first magnitude to said second magnitude and terminating said etching when said sensed potential has said particular value characteristic of said specific thickness.

References Cited in the file of this patent

UNITED STATES PATENTS

| | | |
|---|---|---|
| 1,882,962 | Sawford | Oct. 18, 1932 |
| 2,519,945 | Twele et al. | Aug. 22, 1950 |
| 2,532,908 | Hangosky et al. | Dec. 5, 1950 |
| 2,644,852 | Dunlap | July 7, 1953 |
| 2,746,918 | Whittington | May 22, 1956 |
| 2,763,608 | Pool | Sept. 18, 1956 |
| 2,767,137 | Evers | Oct. 16, 1956 |
| 2,846,346 | Bradley | Aug. 5, 1958 |
| 3,023,153 | Kurshan | Feb. 27, 1962 |